UNITED STATES PATENT OFFICE.

GEORGE S. WOLFF, OF PHILADELPHIA, PENNSYLVANIA

TREATING LAC.

SPECIFICATION forming part of Letters Patent No. 345,202, dated July 6, 1886.

Application filed May 5, 1884. Renewed December 7, 1885. Serial No. 184,989. (No specimens.)

*To all whom it may concern:*

Be it known that I, GEORGE S. WOLFF, a citizen of the United States, and a resident of Philadelphia, Pennsylvania, have invented a Treatment of Lac and a New Product therefrom, of which the following is a specification.

The object of my invention is to obtain a new product from lac; and my invention consists in treating the lac (either shellac, seed-lac, or stick-lac) with sulphuric acid, substantially in the manner which I will now proceed to describe.

In about three pounds of sulphuric acid, which may be the oil of vitriol of commerce, I place about one pound of lac, and stir at intervals for from ten to fourteen days, or until there is a homogeneous mass which is free from lumps.

It is not essential in conducting the process that the precise proportions of ingredients given above should be adhered to, or that the stirring at intervals should be continued for any specific time; but I have found in practice and in treating ordinary shellac that good results may be obtained by following the above rules. If the proportion of acid is increased, the process will be hastened, but the expense will be increased, and if the proportion of acid is decreased the process will be retarded. The character of the lac may play a part in deciding the best proportions. For instance, there is the lac known in the trade as "Campbell's D. C.," which consists of very thin flakes, and these can be acted on more promptly by the acid than the lac consisting of lumps of considerable size, such as the "Garnet lac" and "Button lac" of commerce.

To remove the acid from the above-described solution of lac in sulphuric acid I adopt the following treatment: Into the solution I pour about fifteen pounds of clear water, stirring the mixture while the water is being poured in. The result of this treatment is a heavy precipitate and a quantity of free acid. The precipitate I then dissolve in eight fluid pounds of clear water, and into this solution stir a saturated solution of salt, consisting of about one pound of salt in six fluid pounds of water. I thus obtain a precipitate, which may be again dissolved in clear water, this alternate precipitation by salt-water and solution of the precipitate in clear water being continued until a precipitate is obtained practically free from traces of acid.

It is not essential that the relative proportions of the solution, clear water, and salt-water given above should be strictly adhered to in carrying out this part of the process. I give them as the proportions which I have found suitable in practice; but they may be departed from to some extent without material variance in result. In any case, however, care should be taken that the quantity of water poured upon the original solution of lac in sulphuric acid is great enough to prevent the evolution, in making the mixture, of a high degree of heat, which would injuriously affect the character of the precipitate. I have found in practice that to this end it is desirable that the volume of water used should not be less than five times greater than that of the acid employed to make the solution.

When a precipitate considered sufficiently free from acid has been obtained in the manner above described, it is dried, either by exposure to the atmosphere or by artificial means, care being taken in the latter case to employ a temperature not exceeding 180° Fahrenheit, so as to avoid decomposition of the precipitate. If allowed to dry undisturbed, the precipitate will take the form of a solid cake or mass, which is, however, quite friable and easily broken into small fragments. This product differs materially, both in appearance and in properties, from the lac before treatment, being infusible, readily soluble in clear water, and quite adhesive when so dissolved in suitable proportions. It will not burn with a bright flame, as do lacs and other resins. These changes I attribute principally to the abstraction from the lac of a portion of its hydrogen by the above-described process of treatment with sulphuric acid.

The product may be molded into any desired shapes before it has become dry, and a small quantity of glycerine may be mixed with it before molding, so as to render the mass sufficiently plastic to readily take and retain the desired form.

From the dried product what I term a "varnish" or "sizing" may be made by dissolving it in water in the proportion of about two parts of water to one of the product. These proportions may be varied, according to the desired consistence of the varnish. This varnish or sizing may be applied with useful effect to the surfaces of various materials, such as textile fabrics, paper, leather, &c.

I do not in this application claim the new product of partially-dehydrated lac above described, that having been made the subject of another application filed by me March 30, 1885, Serial No. 160,677; but I here claim as my invention—

1. The within-described process of partially dehydrating lac by subjecting it to the action of sulphuric acid, substantially as described.

2. The within-described process of treating lac, to wit: dissolving it in sulphuric acid, removing the acid and precipitating solid matter, and drying the latter, substantially as herein set forth.

In testimony whereof I have signed my name to this specification in the presence of two subscribing witnesses.

GEORGE S. WOLFF.

Witnesses:
 JOHN M. CLAYTON,
 HARRY SMITH.